June 8, 1937.  L. J. ANDERSON  2,083,355
COMBINED PICTURE AND SOUND RECORDING APPARATUS
Filed Jan. 31, 1934
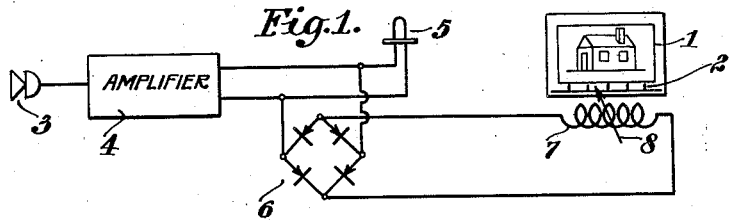
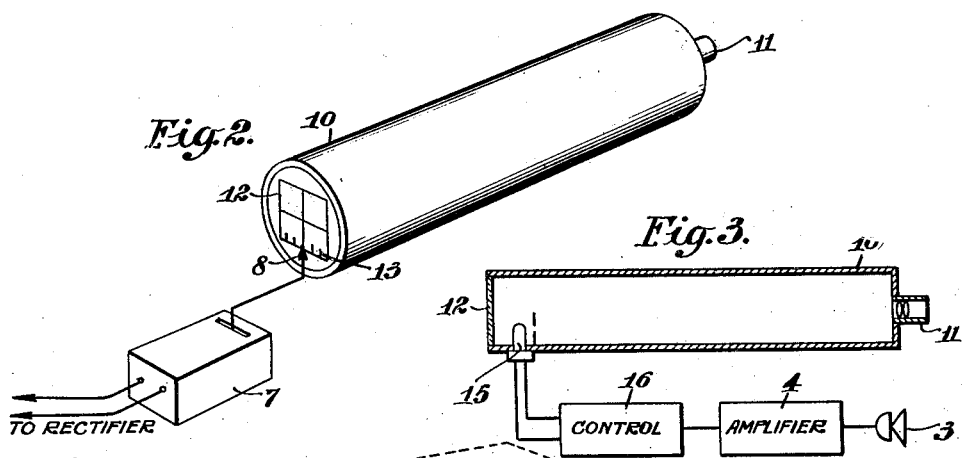
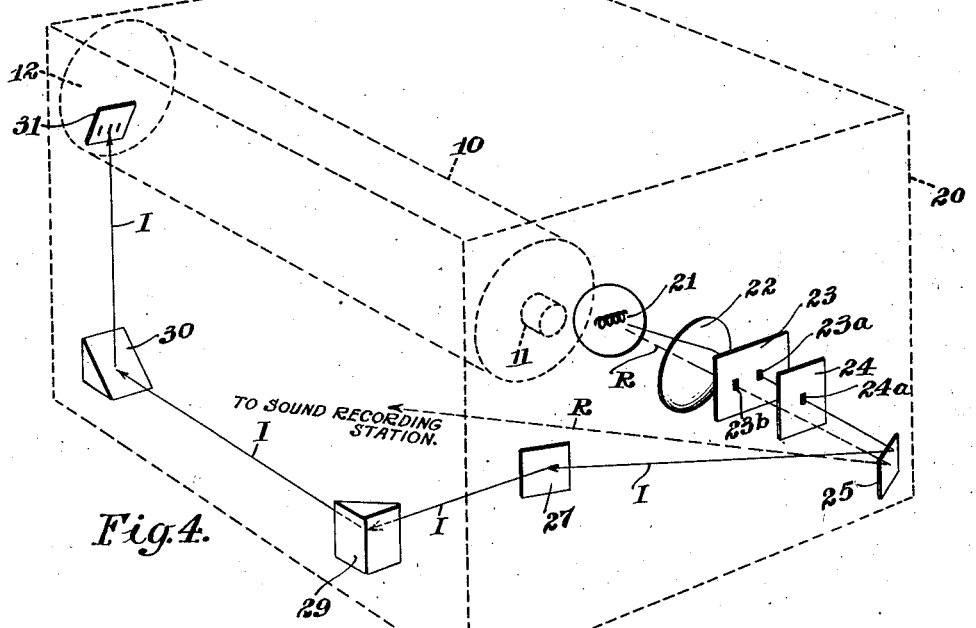
INVENTOR:
Leslie J. Anderson,
BY J R Goldsborough
ATTORNEY.

Patented June 8, 1937

2,083,355

UNITED STATES PATENT OFFICE 2,083,355

COMBINED PICTURE AND SOUND RECORDING APPARATUS

Leslie J. Anderson, Westmont, N. J., assignor to Radio Corporation of America, a corporation of Delaware Application January 31, 1934, Serial No. 709,095

2 Claims. (Cl. 88—16.2)

This invention relates to combined picture and sound recording apparatus, and more particularly to means, in such apparatus, for enabling the operator to simultaneously and conveniently both observe the field of action and determine the character of the sound being recorded.

The primary object of my invention is to provide combined action and sound indicating means in a manner such that one person is enabled to simultaneously operate the camera which records the action and control the modulation of the accompanying sound.

Another object of my invention is to provide a single, compact unit of this character which can easily be incorporated in a combined sound and picture recording camera as an integral part thereof.

Still another object of my invention is to so provide, in a combined picture and sound recorder, indicating means for indicating both the field of view and some predetermined characteristic of the sound being recorded that the operator will be free to simultaneously devote his undivided attention to both the picture recording act and the sound recording act with maximum efficiency.

A further object of my invention is to provide, in combined picture and sound recording apparatus, indicating means of the character set forth which is simple in construction, economical in cost, and efficient in operation.

In accordance with one modification of my invention I combine with the usual view finder of a picture camera a scale or the like indicative of some characteristic of the sound being recorded to accompany a picture. A traveling element, such as a meter needle, a movable light beam, etc., may then be made to move across the scale in accordance with the particular characteristic for which the scale is designed, and the operator may view this traveling element as he looks through the view finder to determine the field of action for the picture.

The novel features which I consider characteristic of my invention are set forth with particularity in the appended claims. However, the invention itself, together with additional objects and advantages thereof, will best be understood from the following description of several specific embodiments, when taken in connection with the accompanying drawing in which Figure 1 is a diagrammatic view generally illustrating the features of my invention, Figure 2 is a perspective view of a view finder barrel with my invention applied thereto in the manner illustrated by Figure 1, Figure 3 is a central sectional view of a view finder barrel with a modified form of indicator applied thereto, and Figure 4 is a perspective view of a camera diagrammatically illustrating a further modification.

Referring to the drawing, wherein similar reference numerals indicate corresponding parts throughout, there is shown, in Figure 1, a view finder 1 having a scale 2 thereon designating some predetermined characteristic of sound, for example volume. Sound impressed on a microphone 3 to accompany the action or view delineated by the view finder 1 sets up pulsating currents which are fed to an amplifier 4 the output of which actuates a galvanometer mirror 5 for imparting a wavy motion to a beam of light from a suitable source. A portion of the output current from the amplifier 4 may be rectified by a rectifier 6 for energizing a motor 7 which actuates a needle 8 and moves it across the scale 1. By looking through the view finder 1, an operator can, therefore, simultaneously ascertain the action which is being recorded at the action recording station of the camera and the volume, or other predetermined characteristic, of the sound being recorded at the sound recording station of the camera to accompany the action.

The device of Figure 1 may be applied to a combined picture and sound recording camera in the manner illustrated in Figure 2. The numeral 10 designates the usual view finder barrel supplied with an eye-piece 11 and housing a view finder 12. As in the case of Figure 1, the view finder 12 has a series of markings, or a scale 13, thereon indicative of the level of the sound which is recorded, and the needle 8 moves across the scale 13 under the influence of the motor 7. An operator looking into the eye-piece 11 can simultaneously see both the field embraced by the view finder 12 and the position of the needle 8 on the scale 13.

In Figure 3, I have shown a modified form of my invention in which a source of illumination, such as a neon lamp, is used as a visible indicating means for indicating the condition of the sound. The lamp 15 is inserted in the barrel 10 a distance insufficient to substantially obstruct the finder 12, although clearly in the line of sight of the operator. The amplifier 4 may supply current to a suitable control device, such as a filter, gain control, or the like 16 for energizing the lamp 15 only when the sound impressed upon the microphone 3 has the particular characteristic for which the control 16 is set. Looking through the eye-piece 11, then, the operator not only sees the scene embraced by the finder 12, but he also sees when the lamp 15 glows. To prevent the glow of the lamp from being too bright and thus annoying to the eye, an apertured light mask 17 may be placed in front of the lamp 15. If desired, the control 16 may be made an integral part of the amplifier 4.

Figure 4 illustrates my invention applied to a combined sound and picture recorder in which the vibrating mirror is actuated mechanically instead of electrically, although it could, obviously, be actuated electrically as well. The camera is generally designated by the numeral 20 and includes both an action recording station and a picture recording station (not shown). The camera 20 also houses a light source 21 the filament of which is focused by a lens 22 on a mechanically actuated lens mirror 25, the mirror 25 serving to focus the aperture 23b on a suitable optical system (not shown) which directs the recording light beam R onto the film (also not shown) at the sound recording station. A second light beam I, which serves as an an indicating beam, passes through the apertures 23a and 24a, the latter of which is focused by the lens mirror 25 on a screen 31 in the view finder barrel 10, the beam I being reflected by the mirror 25 in a horizontal path to a reflector 27, and thence in a horizontal path to a prism 29 which bends it at right angles and directs it, again in a horizontal path, to a second prism 30. The prism 30 then bends the light beam I upwardly in a vertical path onto the viewing screen 31 which is placed adjacent the view finder 12. Since the screen 31 occupies only a small portion of the finder barrel 10, the image of the aperture 24a on the screen 31 may be conveniently viewed along with the scene revealed by the finder 12. The exact position of the screen 31 in the barrel 10 may, of course, be so selected as to be most suitable to the eye.

While I have shown and described certain specific embodiments of my invention, it will be apparent to those skilled in the art that many modifications thereof are possible. For example, in the modification of Figure 3, two or more indicating lamps may be supplied, at least one of which will become energized when the sound is of a predetermined minimum level and another when the sound is of a predetermined maximum level. This enables the operator to tell at once whether the signal currents are too weak, too strong, or within the desired range. Many other modifications will, no doubt, readily suggest themselves. My invention, therefore, is not to be limited except insofar as is necessitated by the prior art and by the spirit of the appended claims.

I claim as my invention:

1. In combined picture and sound recording apparatus, an action recording station, a sound recording station, a view finder for delineating the field of action recorded at said action recording station, a scale located within the view finder and within the field of view of said view finder and representative of a predetermined characteristic of the sound recorded at said sound recording station to accompany the action, a traveling element movable across said scale, and means for moving said element across said scale in accordance with the characteristic represented by said scale.

2. In combined sound and picture recording apparatus, an action recording station, a sound recording station, a view finder for delineating the field of action recorded at said action recording station, a scale located within the view finder housing and representative of a predetermined characteristic of the sound recorded at said sound recording station to accompany the action, an indicator movable across said scale, a motor for moving said indicator across said scale, and means for energizing said motor in accordance with the characteristic indicated by said scale.

LESLIE J. ANDERSON.